US009356799B2

(12) United States Patent
Davari

(10) Patent No.: US 9,356,799 B2
(45) Date of Patent: May 31, 2016

(54) ETHERNET RING PROTECTION WITHOUT MAC TABLE FLUSHING

(75) Inventor: Shahram Davari, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 629 days.

(21) Appl. No.: 13/170,765

(22) Filed: Jun. 28, 2011

(65) Prior Publication Data
US 2013/0003530 A1 Jan. 3, 2013

(51) Int. Cl.
H04L 12/437 (2006.01)
H04L 12/46 (2006.01)

(52) U.S. Cl.
CPC ............. H04L 12/437 (2013.01); H04L 12/465 (2013.01)

(58) Field of Classification Search
CPC .......................... H04L 12/437; H04L 12/465
USPC .......................... 370/352, 225, 255, 258, 406
See application file for complete search history.

(56) References Cited

U.S. PATENT DOCUMENTS

| 7,227,872 B1* | 6/2007 | Biswas et al. | 370/465 |
| 2004/0049580 A1* | 3/2004 | Boyd et al. | 709/226 |
| 2004/0083286 A1* | 4/2004 | Holden et al. | 709/225 |
| 2004/0170184 A1* | 9/2004 | Hashimoto | 370/401 |
| 2006/0109802 A1* | 5/2006 | Zelig et al. | 370/258 |
| 2008/0298371 A1* | 12/2008 | Kobatake | 370/395.31 |
| 2009/0109843 A1* | 4/2009 | Yang | 370/225 |
| 2009/0268746 A1* | 10/2009 | Ogasahara et al. | 370/406 |
| 2009/0274044 A1* | 11/2009 | Goose et al. | 370/225 |
| 2009/0279518 A1* | 11/2009 | Falk et al. | 370/338 |
| 2010/0020814 A1* | 1/2010 | Thyni | 370/412 |
| 2010/0185859 A1* | 7/2010 | Unagami et al. | 713/168 |
| 2010/0260040 A1* | 10/2010 | Wu | 370/223 |
| 2010/0260196 A1* | 10/2010 | Holness et al. | 370/406 |

* cited by examiner

Primary Examiner — Khaled Kassim
(74) Attorney, Agent, or Firm — Oblon, McClelland, Maier & Neustadt, L.L.P

(57) ABSTRACT

A network device located in an Ethernet ring may be operable to determine binding between a MAC address and a peer device in the Ethernet ring. The binding may indicate that the MAC address is behind the peer device. When an Ethernet ring failure occurs, the network device may be operable to update forwarding information based on a ring topology of the Ethernet ring, a position of the failure on the Ethernet ring and the binding. The forwarding information may indicate which ring port that is used on the network device to forward MAC frames to a destination corresponding to the MAC address. The network device may then forward the MAC frames based on the updated forwarding information. The Ethernet ring may utilize a VLAN frame format, a Q-in-Q frame format or a MAC-in-MAC frame format. The forwarding information may comprise a MAC table and/or a protection table.

19 Claims, 7 Drawing Sheets

ETHERNET RING PROTECTION WITHOUT MAC TABLE FLUSHING

CROSS-REFERENCE TO RELATED APPLICATIONS/INCORPORATION BY REFERENCE

Not applicable

FIELD OF THE INVENTION

Certain embodiments of the invention relate to Ethernet communication systems. More specifically, certain embodiments of the invention relate to a method and system for Ethernet ring protection without MAC table flushing.

BACKGROUND OF THE INVENTION

Ethernet is a family of frame-based computer networking technologies for communication networks. It defines a number of wiring and signaling standards for the physical layer of the Open Systems Interconnect (OSI) networking model as well as common addressing format and a variety of medium access control (MAC) procedures at the lower part of the data link layer (OSI layer 2). Ethernet was initially defined as a local area network (LAN) technology to internet the computers within a small organization in which these host computers were close in proximity to each other. Over the years, Ethernet has become such a popular technology that it became the default data link layer mechanism for data transport. Physical topologies of an Ethernet network may comprise, for example, mesh topology or ring topology.

Ethernet rings enable communication of Ethernet data traffic in various ring topologies including a single-ring topology or a multi-ring topology. Ethernet rings may provide wide-area multipoint connectivity more economically than Ethernet meshes due to their reduced number of links. A network device, such as a switch, in an Ethernet ring is called a ring node. Each ring node is connected to adjacent ring nodes participating in the same Ethernet ring, using two independent links. A ring link is bounded by two adjacent ring nodes, and a port for a ring link is called a ring port.

Based on ITU-T Ethernet ring protection switching (ERPS) specification, loop avoidance in an Ethernet ring is achieved by guaranteeing that, at any given time, traffic may flow on all but one of the ring links. This particular link is called the ring protection link (RPL), and under normal conditions this ring protection link is blocked, that is, it is not used for service traffic. One designated ring node, called the RPL owner node, is responsible for blocking traffic at one end of the RPL link. Under an Ethernet ring failure condition, the RPL owner node is responsible for unblocking its end of the RPL link, unless the RPL link has failed, allowing the RPL link to be used for traffic. The other ring node adjacent to the RPL link, called the RPL neighbor node, may also participate in blocking or unblocking its end of the RPL link.

The event of an Ethernet ring failure results in protection switching of the service traffic. A Multicast automatic protection switching (APS) message is used to coordinate the activities of switching on/off the RPL link. Any failure along the ring triggers transmission of periodic APS messages (APS signal fail messages) along both directions from the ring nodes adjacent to the failed ring link after these ring nodes have blocked the ports facing the failed link. Upon reception of APS messages, the RPL owner node and the RPL neighbor node will unblock their RPL ports, creating yet another loop free ring topology. In this regard, a single link failure anywhere in the ring still ensures a loop free ring topology. After receiving the APS message, all ring nodes that receive the APS message in the Ethernet ring will flush their MAC addresses for the ring ports in their MAC table. In such instances, all data packets will be sent (flooded) by such ring node to both ring ports until the MAC addresses are re-learned for the MAC table.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for Ethernet ring protection without MAC table flushing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
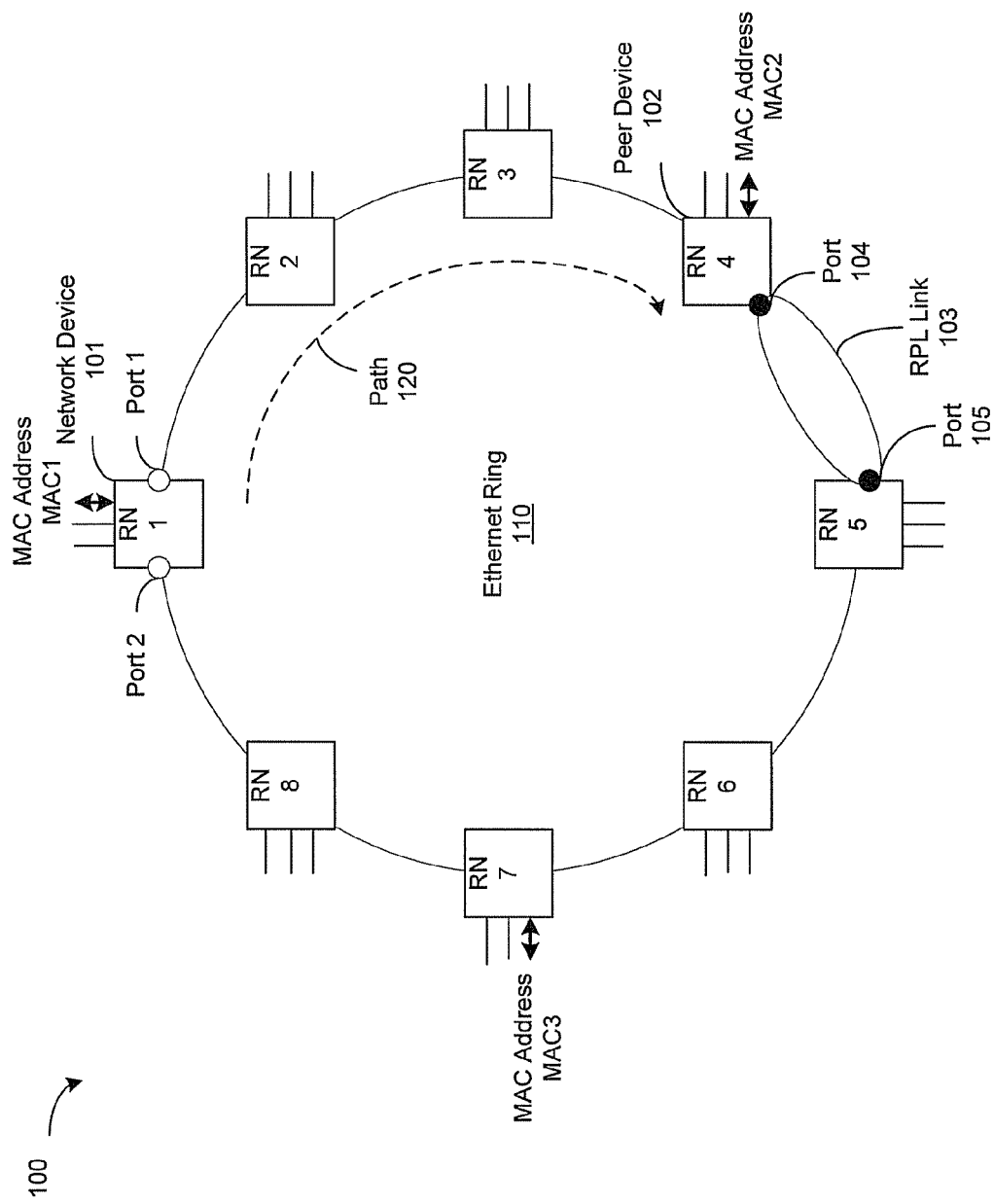
FIG. 1A is a block diagram illustrating an exemplary Ethernet ring topology, in connection with an embodiment of the invention.

Certain embodiments of the invention can be found in a method and system for Ethernet ring protection without MAC table flushing. In various embodiments of the invention, a network device located in an Ethernet ring may be operable to determine binding between a medium access control (MAC) address and a peer device in the Ethernet ring, where the binding may indicate that the MAC address is behind the peer device. When an Ethernet ring failure occurs, the network device may be operable to update forwarding information based on a ring topology of the Ethernet ring, a position of the failure on the Ethernet ring and the binding. The forwarding information may indicate which ring port that is used on the network device to forward MAC frames to a destination corresponding to the MAC address. The MAC frames may then be forwarded by the network device based on the updated forwarding information.

In an exemplary embodiment of the invention, the Ethernet ring may utilize a virtual local area network (VLAN) frame format, and each of MAC frames from the MAC address may comprise a first VLAN tag. In this regard, the network device may be operable to utilize a second VLAN tag in each of the MAC frames from the MAC address, where the second VLAN tag may identify the peer device. The binding between the MAC address and the peer device may then be determined by the network device based on the second VLAN tag.

In an exemplary embodiment of the invention, the Ethernet ring may utilize a Q-in-Q frame format. Each of MAC frames from the MAC address may comprise a first VLAN tag and a second VLAN tag, and the first VLAN tag may comprise a customer tag and the second VLAN tag may comprise a service tag. In this regard, the network device may be operable to utilize a third VLAN tag in each of the MAC frames from the MAC address, where the third VLAN tag may identify the peer device. The binding between the MAC address and the peer device may then be determined by the network device based on the third VLAN tag.

In an exemplary embodiment of the invention, the Ethernet ring may utilize a MAC-in-MAC frame format. In the MAC-in-MAC frame format, each of MAC frames from the MAC address may comprise the MAC address and a backbone source MAC address, and the backbone source MAC address may identify the peer device. In this regard, the network device may be operable to determine the binding between the MAC address and the peer device based on the backbone source MAC address.

In an exemplary embodiment of the invention, the forwarding information may comprise a MAC table with a MAC address field, a ring port field and a ring node field. In this regard, the network device may be operable to enter or place an entry in the ring node field corresponding to the MAC address with an identifier of the peer device based on the binding. An entry in the ring port field corresponding to the MAC address may be updated with a ring port for forwarding the MAC frames by the network device based on the ring topology, the failure position and the peer device entry in the ring node field.

In another exemplary embodiment of the invention, the forwarding information may comprise a MAC table and a protection table. The MAC table may comprise a MAC address field and a ring node field, and the protection table may comprise a ring node field and a ring port field. In this regard, the network device may be operable to enter or place an entry in the ring node field of the MAC table corresponding to the MAC address with and identifier of the peer device based on the binding. An entry in the ring port field of the protection table corresponding to the peer device in the ring node field of the protection table may be updated with a ring port for forwarding the MAC frames by the network device, based on the ring topology and the failure position. The network device may then be operable to forward the MAC frames based on the updated protection table.

FIG. 1A is a block diagram illustrating an exemplary Ethernet ring topology, in connection with an embodiment of the invention. Referring to FIG. 1, there is shown an Ethernet ring topology 100. The Ethernet ring topology 100 may comprise an Ethernet ring 110, a plurality of ring nodes, of which ring nodes 1-8 are illustrated, and a ring protection link (RPL) 103. A ring node (RN) such as the ring node 1 in the Ethernet ring 110 may comprise a network device such as a switch. In various embodiments, the ring node 1 is also referred to as network device 1 and the ring node 4 is also referred to as peer device 102. The ring node 1 may comprise two ring ports, namely, port 1 and port 2. The ring node 4 may comprise a ring port, namely, port 104 which is coupled to the RPL link 103. The ring node 5 may comprise a ring port, namely, port 105 which is coupled to the RPL link 103. The Ethernet ring 110 may utilize, for example, a VLAN frame format, a Q-in-Q frame format or a MAC-in-MAC frame format.

In exemplary operation, the ring node 4 may block port 104 and the ring node 5 may block port 105 to remove the RPL link 103 for loop avoidance in the Ethernet ring 110. The network device 101 may learn a MAC address MAC2 on the port 1. MAC frames with source MAC address MAC1 and destination MAC address MAC2 may be sent to port 1 of the network device 101 and may travel via a path 120 (RN 1-RN 2-RN 3-RN 4 path) to a destination device behind the peer device 102.

Figure 1B:
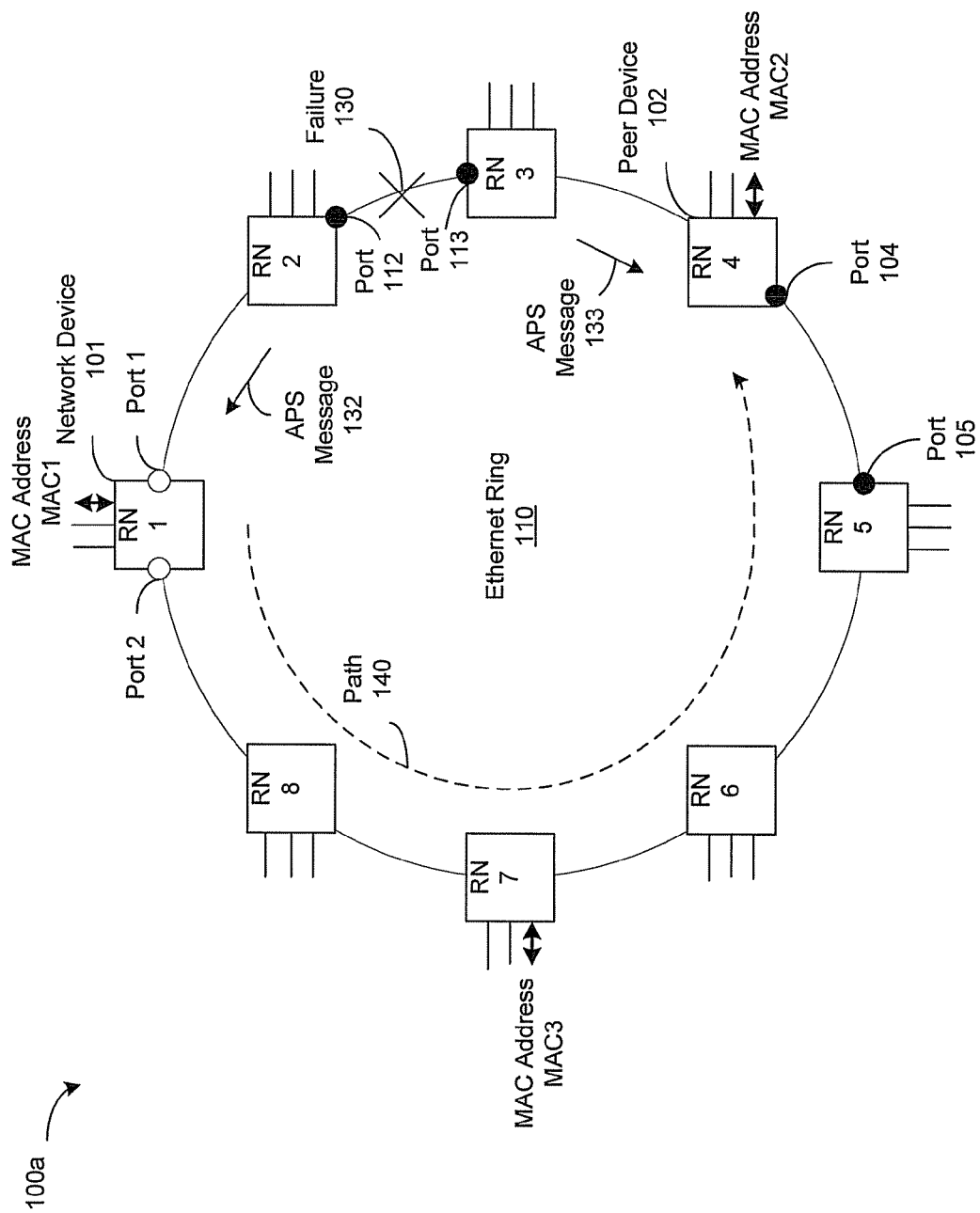
FIG. 1B is a block diagram illustrating an exemplary Ethernet ring failure recovery, in accordance with an embodiment of the invention.

FIG. 1B is a block diagram illustrating an exemplary Ethernet ring failure recovery, in accordance with an embodiment of the invention. Referring to FIG. 1, there is shown an Ethernet ring topology 100a under a ring failure condition. The Ethernet ring topology 100a may comprise the Ethernet ring 110 and the ring nodes 1-8 described above with respect to FIG. 1A. The Ethernet ring 110 may comprise a ring failure 130 between ring node 2 and ring node 3. The ring node 2 may comprise a ring port, namely, port 112 which is facing the failure position 103. The ring node 3 may comprise a ring port, namely, port 113 which is facing the failure position 103.

In exemplary operation, when such a ring failure 130 occurs, MAC frames from source MAC address MAC1 cannot reach the destination at the destination MAC address MAC2 via the path 120 (RN 1-RN 2-RN 3-RN 4 path) utilizing the port 1 of the network device 101 (ring node 1). The ring node 2 and the ring node 3 may transmit periodic automatic protection switching (APS) messages 132, 133 with their IDs along both directions. The APS message 132 may be received by the ring node 5, and the APS message 133 may be received by the ring node 4. Upon reception of the APS messages 132, 133, ring node 4 and ring node 5 may unblock the port 104 and the port 105 respectively.

In an exemplary embodiment of the invention, each ring node such as the network device 101 (ring node 1) may be operable to determine binding between a MAC address and one of other ring nodes in the Ethernet ring 110, where the binding indicates that the MAC address is behind one of the other ring nodes. For example, the binding may indicate that the MAC address MAC2 is behind the peer device 102 (ring node 4) and the MAC address MAC3 is behind the ring node 7. The network device 101 (ring node 1) may have knowledge of the Ethernet ring topology 100. Based on the APS messages 132, 133, the network device 101 may also have knowledge of the failure position 130. In this regard, the network device 101 may be operable to update forwarding information such as, for example, a forwarding table based on the Ethernet ring topology 100, the ring failure position 130 and the bindings of the MAC addresses. The forwarding information may indicate which ring port (port 1 or port 2) that is used on the network device 101 to forward MAC frames to a destination corresponding to a destination MAC address. In this regard, for example, the forwarding information may be updated to indicate that, instead of the port 1, the port 2 will be used to forward MAC frames from the source MAC address MAC1 to the destination MAC address MAC2. The network device 101 may then be operable to forward the MAC frames based on the updated forwarding information. For example, based on the updated forwarding information, MAC frames with source MAC address MAC1 and destination MAC address MAC2 may be sent to port 2 of the network device 101 and may travel via a path 140 (RN 1-RN 8-RN 7-RN 6-RN 5-RN 4 path) to a destination device behind the peer device 102.

In the exemplary operation illustrated in FIG. 1B, the network device 101 does not flush a MAC table and/or flood the ring ports to recover the ring failure 130. MAC table flushing is usually a slow process and may not meet the 50 msec required time scale for completing the ring protection. Flushing of MAC table requires a ring node to relearn those flushed MAC addresses, which may take from several seconds to several minutes. Before learning any such MAC address, a ring node may flood the traffic to both of its ring ports, which may consume double of the required bandwidth on a Ethernet ring, and therefore may cause congestion and packet drop of the traffic flowing on the Ethernet ring.

In the exemplary operation illustrated in FIG. 1B, the network device 101 does not flush the MAC table and may be able to operate with a fast protection switching time, which may be way below the 50 msec requirement. The network device 101 does not need to relearn the MAC addresses and therefore may not need to flood the traffic and consume extra bandwidth during the protection switching time.

Figure 2:
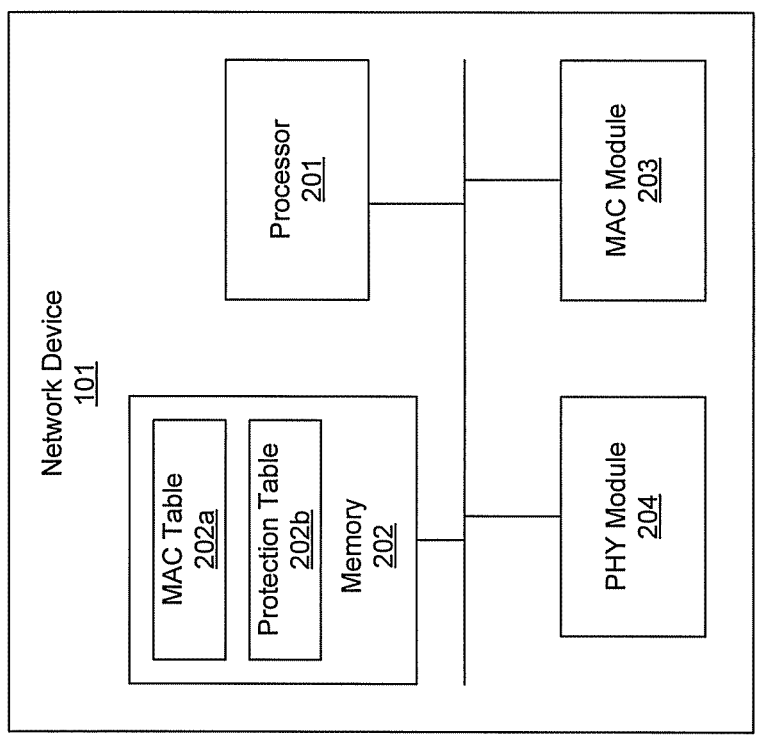
FIG. 2 is a block diagram illustrating an exemplary network device in an Ethernet ring, in accordance with an embodiment of the invention.

FIG. 2 is a block diagram illustrating an exemplary network device in an Ethernet ring, in accordance with an embodiment of the invention. Referring to FIG. 2, there is shown a network device 101. The network device 101 may be in an Ethernet ring such as the Ethernet ring 110. The network device 101 may comprises a processor 201, a memory 202, a MAC module 203 and a PHY module 204.

The processor 201 may comprise suitable logic, circuitry, interfaces and/or code that may be operable to manage and/or control operations of various components in the network device 101 such as, for example, the PHY module 204 and/or the MAC module 203. The processor 201 may process signals associated with the PHY module 204 and/or the MAC modules 203. The processor 201 may comprise, for example, a flexible processor (FP) array. In an exemplary embodiment of the invention, the processor 201 may be operable to determine binding between a MAC address such as the MAC2 and a ring node such as the peer device 102 in the Ethernet ring 110. The binding may indicate that the MAC address MAC2 is behind the peer device 102. The processor 201 may be operable to store the binding information in the memory 202. When an Ethernet ring failure such as the ring failure 130 occurs, the processor 201 may be operable to update forwarding information based on knowledge of the Ethernet ring topology 100, the ring failure position 130 on the Ethernet ring 110 and the binding information. The updated forwarding information such as a MAC table 202*a* and/or a protection table 202*b* may be stored in the memory 202. The processor 201 may be operable to forward MAC frames from, for example, the source MAC address MAC1 to the destination MAC address MAC2 based on the updated forwarding information.

The memory 202 may comprise suitable logic, circuitry, interfaces and/or code that may be operable to store information such as executable instructions and/or data that may be utilized by the processor 201. The memory 202 may comprise RAM and/or ROM. In an exemplary embodiment of the invention, the memory 202 may store the updated forwarding information such as the MAC table 202*a* and/or the protection table 202*b*. The MAC table 202*a* and/or the protection table 202*b* may be updated by the processor 201.

The MAC module 203 may comprise suitable logic, circuitry, interfaces and/or code that may be operable to implement the operability and/or functionality of layer 2 or data link layer of OSI network model. The MAC module 203 may communicate with the PHY module 204 via parallel and/or serial links, for example. The MAC module 203 may provide addressing and channel access control mechanisms. In an exemplary embodiment of the invention, a MAC address such as a backbone MAC address provided by the MAC module 203 may be utilized by the Ethernet ring 110 for discovering or identifying the network device 101 in the Ethernet ring 110.

The PHY module 204 may comprise suitable logic, circuitry, interfaces and/or code that may be operable to implement the operability and/or functionality of layer 1 or physical layer of open systems interconnection (OSI) network model. The PHY module 204 may be operable to handle physical layer requirements, which may comprise, but are not limited to, packetization, data transfer and/or serialization/deserialization (SERDES), in instances where such an operation is required. In an exemplary embodiment of the invention, the PHY module 204 may encode data packets that are to be transmitted to the Ethernet ring 110 via ring ports such as the ring ports 1, 2 on the network device 101 and/or to decode data packets received from the Ethernet ring 110 via the ring ports 1, 2.

In operation, the processor 201 in the network device 101 may be operable to determine binding between a MAC address such as the MAC2 and a ring node such as the peer device 102 in the Ethernet ring 110. The binding may indicate that the MAC address MAC2 is behind the peer device 102. The processor 201 may be operable to store the binding information in the memory 202.

In an exemplary embodiment of the invention, the Ethernet ring 110 may utilize a VLAN frame format such as the IEEE 802.1Q frame format. In such instances, a MAC frame from the source MAC address MAC2 to the destination MAC address MAC1 may comprise a first VLAN tag. The processor 201 may be operable to utilize a second VLAN tag in the MAC frame from the MAC address MAC2, where the second VLAN tag may identify the peer device 102. Accordingly, the binding between the MAC address MAC2 and the peer device 102 may be determined by the processor 201 based on the added second VLAN tag.

In an exemplary embodiment of the invention, the Ethernet ring 110 may utilize a Q-in-Q frame format. In such instances, a MAC frame from the source MAC address MAC2 to the destination MAC address MAC1 may comprise a first VLAN tag and a second VLAN tag, where the first VLAN tag may comprise a customer tag and the second VLAN tag may comprise a service tag. In this regard, the processor 201 may be operable to utilize a third VLAN tag in the MAC frame from the MAC address MAC2, where the third VLAN tag may identify the peer device 102. Accordingly, the binding between the MAC address MAC2 and the peer device 102 may be determined by the processor 201 based on the added third VLAN tag.

In an exemplary embodiment of the invention, the Ethernet ring 110 may utilize a MAC-in-MAC frame format. In the MAC-in-MAC frame format, a MAC frame from the source MAC address MAC2 to the destination MAC address MAC1 may comprise the source MAC address MAC2 and a backbone source MAC address, where the backbone source MAC address may identify the peer device 102. In this regard, the processor 201 may be operable to determine the binding between the MAC address MAC2 and the peer device 102 based on the backbone source MAC address in the MAC frame from the MAC address MAC2.

When an Ethernet ring failure such as the ring failure 130 occurs, the processor 201 may be operable to update the forwarding information stored in the memory 202 based on the knowledge of the Ethernet ring topology 100, the ring failure position 130 on the Ethernet ring 110, and the binding information on the MAC addresses. The updated forwarding information may be again stored in the memory 202. The processor 201 may be operable to forward MAC frames from, for example, the MAC address MAC1 to the MAC address MAC2 based on the updated forwarding information.

In an exemplary embodiment of the invention, the forwarding information may comprise the MAC table 202a with a MAC address field, a ring port field and a ring node field. In this regard, for example, the processor 201 may be operable to enter an entry in the ring node field corresponding to the MAC address MAC2 with an identifier of the peer device 102 based on the binding information. An entry in the ring port field corresponding to the MAC address MAC2 may be updated with a ring port for forwarding the MAC frames by the processor 201 based on the ring topology 110, the failure position 130 and the entry of the peer device 102 in the ring node field.

In another exemplary embodiment of the invention, the forwarding information may comprise the MAC table 202a and the protection table 202b. The MAC table 202a may comprise a MAC address field, and a ring node field, and the protection table 202b may comprise a ring node field and a ring port field. In this regard, for example, the processor 201 may be operable to enter an entry in the ring node field of the MAC table 202a corresponding to the MAC address MAC2 with an identifier of the peer device 102 based on the binding information. An entry in the ring port field of the protection table 202b corresponding to the peer device 102 (ring node 4) in the ring node field of the protection table 202b may be updated with a ring port for forwarding the MAC frames by the processor 201, based on the ring topology 110 and the failure position 130. The processor 201 may then be operable to forward the MAC frames based on the updated protection table 202b.

Figure 3A:
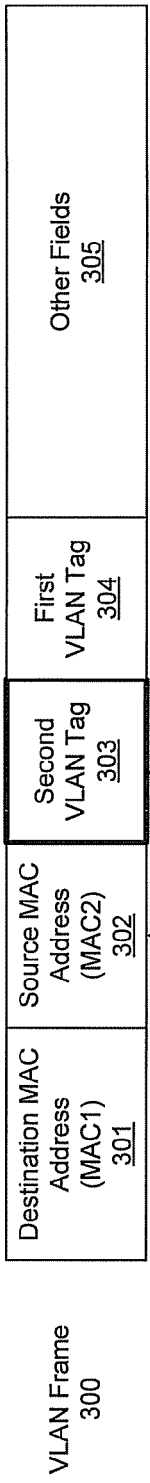
FIGS. 3A-3C are block diagrams that each illustrates exemplary binding between MAC address and ring node, in accordance with an embodiment of the invention.
Figure 3B:
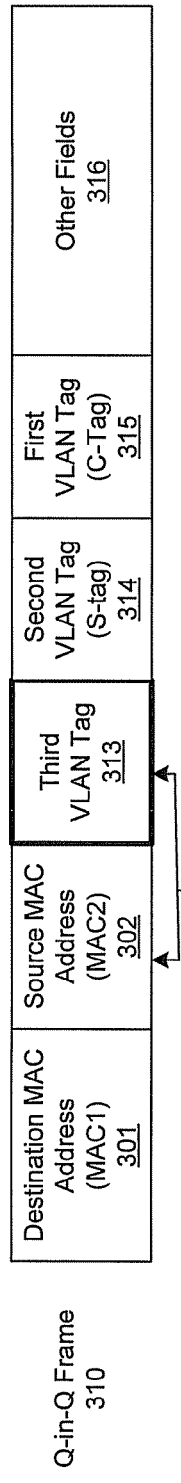
Figure 3C:
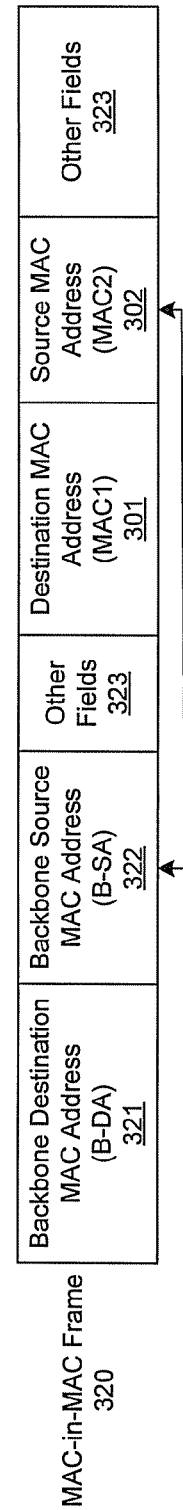

FIGS. 3A-3C are block diagrams that each illustrates exemplary binding between MAC address and ring node, in accordance with an embodiment of the invention.

Referring to FIG. 3A, there is shown a VLAN frame 300. The VLAN frame 300 may have an IEEE 802.1Q VLAN tagging frame format. The VLAN frame 300 may comprise a plurality of fields of which a destination MAC address 301, a source MAC address 302, a first VLAN tag 304, a newly added second VLAN tag 303 and other fields 305 are illustrated. The second VLAN tag 303 is added to identify or represent a ring node where the source MAC address 302 behinds, in an Ethernet ring such as the Ethernet ring 110. For example, the second VLAN tag 303 may identify or represent the peer device 102 in the Ethernet ring 110 in instances when the source MAC address 302 is the MAC address MAC2.

In an exemplary embodiment of the invention, the network device 101 in the Ethernet ring 110 may be operable to learn the binding between the source MAC address 302 and the second VLAN tag 303. Accordingly, the network device 101 may determine, for example, the binding between the MAC address MAC2 and the peer device 102 in the Ethernet ring 110.

Referring to FIG. 3B, there is shown a Q-in-Q frame 310. The Q-in-Q frame 310 may have an IEEE 802.1ad double tagging frame format. The Q-in-Q frame 310 may comprise a plurality of fields of which a destination MAC address 301, a source MAC address 302, a first VLAN tag 315, a second VLAN tag 314, a newly added third VLAN tag 313 and other fields 316 are illustrated. Under the IEEE 802.1ad standard, the first VLAN tag 315 may comprise a customer tag (C-Tag) and the second VLAN tag 314 may comprise a service tag (S-Tag). The third VLAN tag 313 is added to identify or represent a ring node where the source MAC address 302 behinds, in an Ethernet ring such as the Ethernet ring 110. For example, the third VLAN tag 303 may identify or represent the peer device 102 in the Ethernet ring 110 in instances when the source MAC address 302 is the MAC address MAC2.

In an exemplary embodiment of the invention, the network device 101 in the Ethernet ring 110 may be operable to learn the binding between the source MAC address 302 and the third VLAN tag 313. Accordingly, the network device 101 may determine, for example, the binding between the MAC address MAC2 and the peer device 102 in the Ethernet ring 110.

Referring to FIG. 3C, there is shown a MAC-in-MAC frame 320. The MAC-in-MAC frame 320 may have an IEEE 802.1ah-2008 provider backbone bridges (PBB) frame format. The MAC-in-MAC frame 320 may comprise a plurality of fields of which a backbone destination MAC address 321, a backbone source MAC address 322, a destination MAC address 301, a source MAC address 302, and other fields 323 are illustrated. The provider backbone bridges (PPB) offers complete separation of customer and provider domains. For this purpose, the IEEE 802.1ah-2008 standard defines backbone components such as the backbone destination MAC address (B-DA) 321 and the backbone source MAC address (B-SA) 322 in the MAC-in-MAC frame 320. In this regard, the backbone source MAC address 322 may identify or represent a ring node where the source MAC address 302 behinds, in an Ethernet ring such as the Ethernet ring 110. For example, the backbone source MAC address 322 may identify or represent the peer device 102 in the Ethernet ring 110 in instances when the source MAC address 302 is the MAC address MAC2.

In an exemplary embodiment of the invention, the network device 101 in the Ethernet ring 110 may be operable to learn the binding between the source MAC address 302 and the backbone source MAC address 322. Accordingly, the network device 101 may determine, for example, the binding between the MAC address MAC2 and the peer device 102 in the Ethernet ring 110.

Figure 4A:
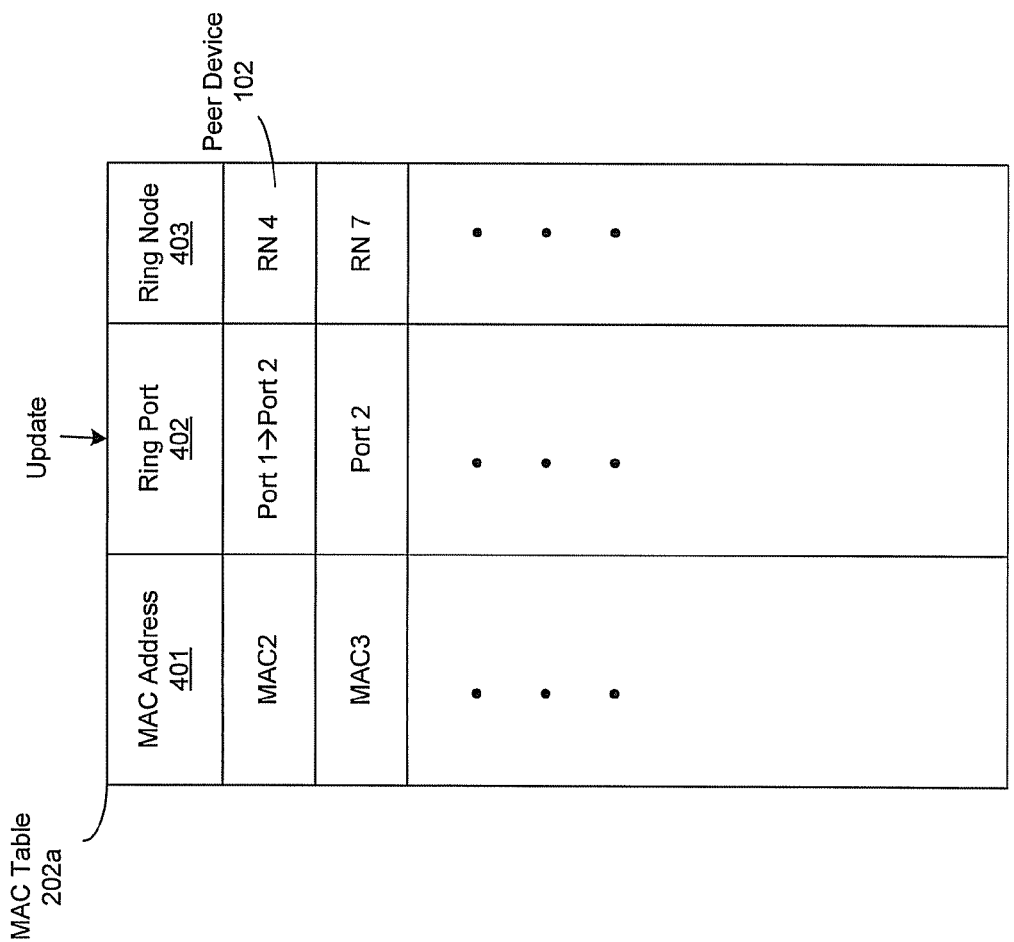
FIGS. 4A-4B are a block diagrams that each illustrates exemplary forwarding table, in accordance with an embodiment of the invention.
Figure 4B:
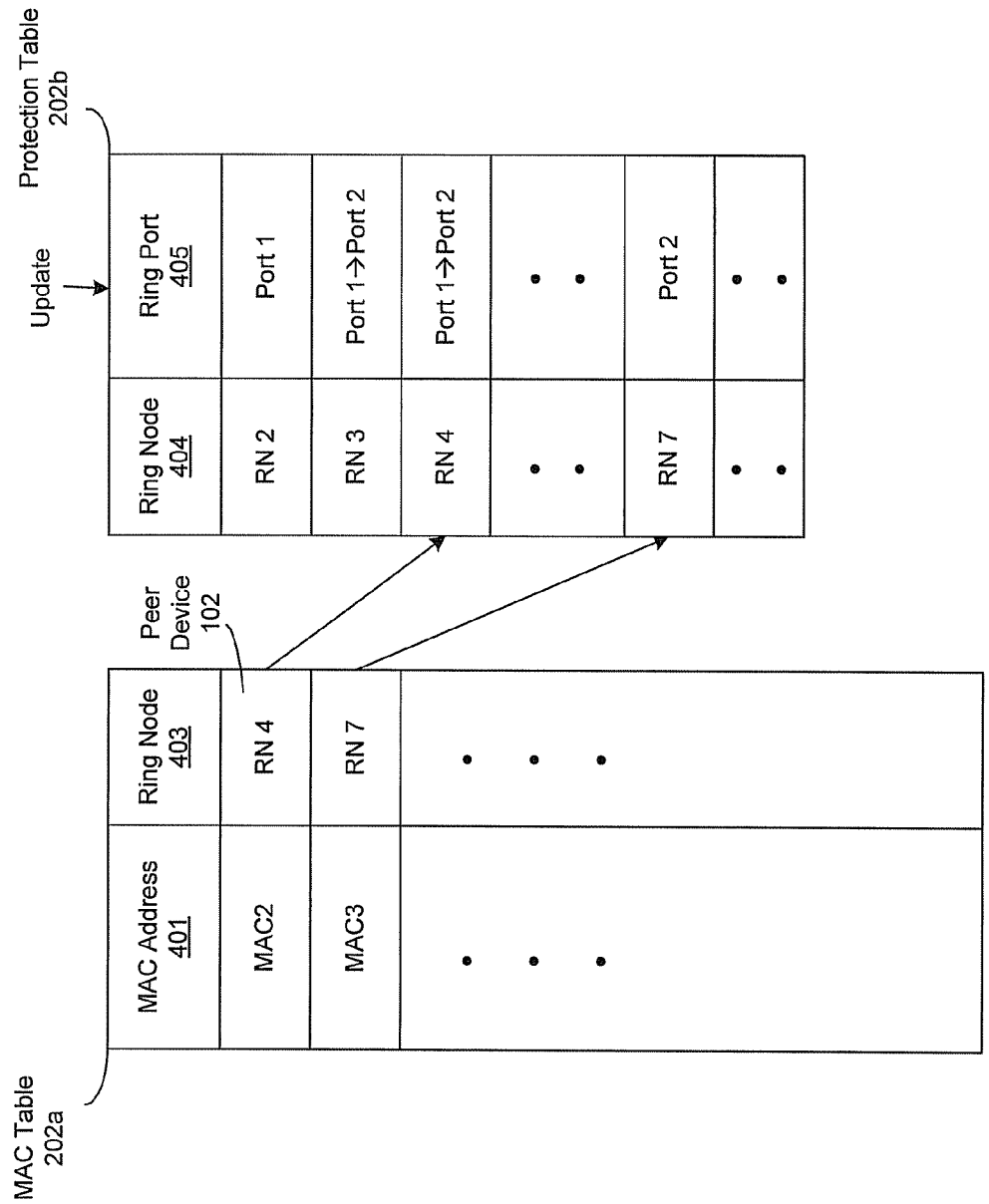

FIGS. 4A-4B are block diagrams that each illustrates exemplary forwarding table, in accordance with an embodiment of the invention.

Referring to FIG. 4A, there is shown a MAC table 202a. The MAC table 202a may be stored in the memory 202 in the network device 101 in the Ethernet ring 110. The MAC table 202a may comprise a MAC address field 401, a ring port filed 402 and a ring node field 403. An entry in the ring port field 402 may indicate which ring port that is used to forward MAC frames to a corresponding destination MAC address in the MAC address field 401. For example, an entry with port 1 in the ring port field 402 corresponding to the MAC address MAC2 indicates that port 1 is used to forward MAC frames to the destination MAC address MAC2. An entry with port 2 in the ring port field 402 corresponding to the MAC address MAC3 indicates that port 2 is used to forward MAC frames to the destination MAC address MAC3.

In an exemplary embodiment of the invention, the processor 201 in the network device 101 may be operable to enter or populate, in the MAC table 202a, an entry in the ring node field 403 corresponding to the MAC address MAC2 with an identifier of the peer device 102 (ring node 4) based on the binding described with respect to FIGS. 3A-3B. Similarly, the processor 201 may be operable to enter or populate, for example, an entry in the ring node field 403 corresponding to the MAC address MAC3 with an identifier of the ring node 7 based on the binding described with respect to FIGS. 3A-3B.

In an exemplary embodiment of the invention, when a ring failure such as the ring failure 130 occurs, the processor 201 in the network device 101 may be operable to update an entry in the ring port field 402 for forwarding MAC frames to a destination MAC address based on the Ethernet ring topology 100, the ring failure position 130 and the corresponding ring node entry in the ring node field 403. For example, the entry in the ring port field 402 corresponding to the MAC address MAC2 may be changed from port 1 to port 2 when the ring failure 130 occurs. In this regard, the processor 201 may be operable to forward MAC frames to a destination MAC address based on the updated MAC table 202*a*.

Referring to FIG. 4B, there is shown a MAC table 202*a* and a protection table 202*b*. The MAC table 202*a* and the protection table 202*b* may be stored in the memory 202 in the network device 101 in the Ethernet ring 110. The MAC table 202*a* may comprise a MAC address field 401 and a ring node field 403. The protection table 202*b* may comprise a ring node field 404 and a ring port field. An entry in the ring port field 402 may indicate which ring port that may be utilized to forward MAC frames to a corresponding destination MAC address in the MAC address field 401. For example, an entry with port 1 in the ring port field 402 corresponding to the MAC address MAC2 indicates that port 1 is used to forward MAC frames to the destination MAC address MAC2. An entry with port 2 in the ring port field 402 corresponding to the MAC address MAC3 indicates that port 2 is used to forward MAC frames to the destination MAC address MAC3.

In an exemplary embodiment of the invention, the processor 201 in the network device 101 may be operable to enter or populate, in the MAC table 202*a*, an entry in the ring node field 403 corresponding to the MAC address MAC2 with an identifier of the peer device 102 (ring node 4) based on the binding described with respect to FIGS. 3A-3B. Similarly, the processor 201 may be operable to enter or populate, for example, an entry in the ring node field 403 corresponding to the MAC address MAC3 with an identifier of the ring node 7 based on the binding described with respect to FIGS. 3A-3B.

In an exemplary embodiment of the invention, the processor 201 in the network device 101 may be operable to enter or populate, in the protection table 202*b*, entries in the ring port field 405 based on the entries in the ring node field 403 of the MAC table 202*a*. For example, an entry with port 1 in the ring port field 405 corresponding to the ring node 2 may be entered by the processor 201. Similarly, an entry with ring port 1 in the ring port field 405 corresponding to the ring node 3 may be entered, an entry with ring port 1 in the ring port field 405 corresponding to the ring node 4 may be entered, and an entry with ring port 2 in the ring port field 405 corresponding to the ring node 7 may be entered. An entry in the ring port field 405 of the protection table 202*b* may indicate which ring port that is used to forward MAC frames to a ring node corresponding to a destination MAC address in the MAC address field 401 of the MAC table 202*a*.

In an exemplary embodiment of the invention, when a ring failure such as the ring failure 130 occurs, the processor 201 in the network device 101 may be operable to update an entry in the ring port field 405 of the protection table 303*b* for forwarding MAC frames to a destination MAC address based on the Ethernet ring topology 100 and the ring failure position 130. For example, when the ring failure 130 occurs, the entry in the ring port field 405 corresponding to the ring node 3 is changed from port 1 to port 2, and the entry in the ring port field 405 corresponding to the ring node 4 is changed from port 1 to port 2. In this regard, the processor 201 may be operable to forward MAC frames to a destination MAC address based on the updated protection table 202*b*.

In the exemplary embodiments of the invention illustrated in FIG. 4A and FIG. 4B, the processor 201 may comprise, for example, a flexible processor (FP) array. In such instances, the ring node entries in the ring node fields 403, 404 may be implemented using class IDs in the flexible processor (FP) configuration. For example, a class ID value may be assigned to a ring node in the Ethernet ring 110, and the class ID values may be entered by the processor 201 in the ring node fields 403, 404.

Figure 5:
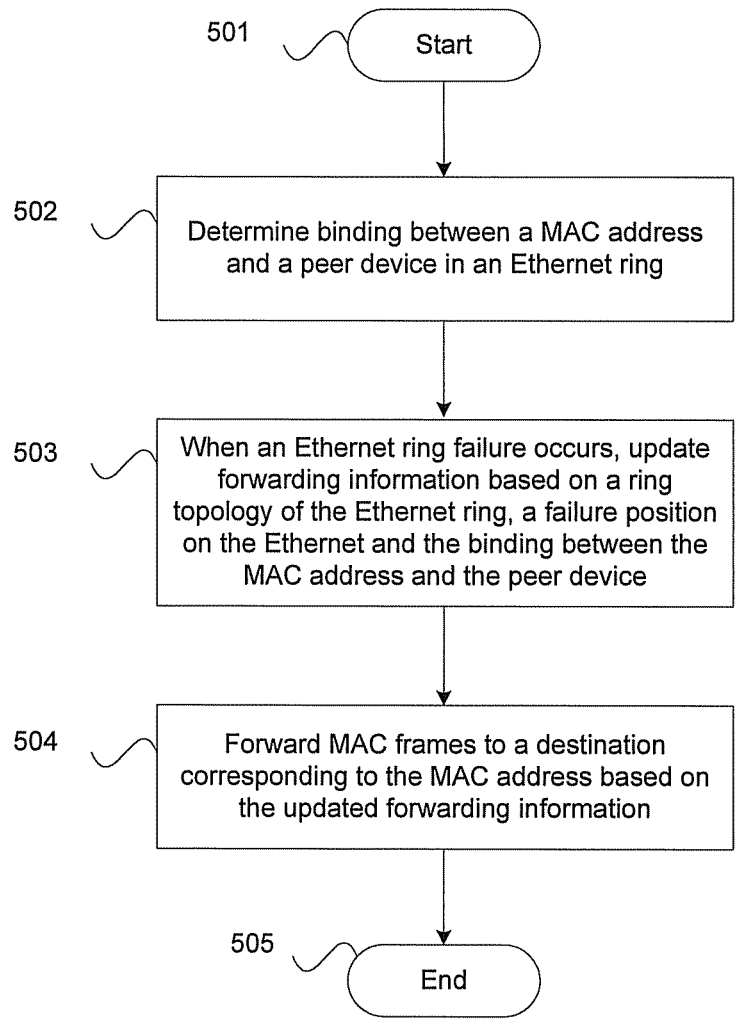
FIG. 5 is a flow chart illustrating exemplary steps for Ethernet ring protection without MAC table flushing, in accordance with an embodiment of the invention.

FIG. 5 is a flow chart illustrating exemplary steps for Ethernet ring protection without MAC table flushing, in accordance with an embodiment of the invention. Referring to FIG. 5, the exemplary steps start at step 501. In step 502, the processor 201 in the network device 101 in the Ethernet ring 110 may be operable to determine binding between a MAC address such as the MAC address MAC2 and a peer device such as the peer device 102 in the Ethernet ring 110. The binding may indicate that the MAC address MAC2 is behind the peer device 102. In step 503, when an Ethernet ring failure such as the ring failure 130 occurs on the Ethernet ring 110, the processor 201 may be operable to update forwarding information stored in the memory 202 in the network device 101, based on a ring topology 100 of the Ethernet ring 110, the failure position 130 and the binding between the MAC address MAC2 and the peer device 102. The forwarding information may comprise, for example, a MAC table 202*a* and/or a protection table 202*b*. In step 504, the processor 201 may be operable to forward MAC frames to a destination corresponding to the MAC address MAC2 based on the updated forwarding information such as the MAC table 202*a* and/or the protection table 202*b*. The exemplary steps may proceed to the end step 505.

In various embodiments of the invention, a processor 201 in a network device 101 located in an Ethernet ring 110 may be operable to determine binding between a MAC address MAC2 and a peer device 102 in the Ethernet ring 110, where the binding may indicate that the MAC address MAC2 is behind the peer device 102. When an Ethernet ring failure 130 occurs, the processor 201 may be operable to update forwarding information based on a ring topology 100 of the Ethernet ring 110, a position of the failure 130 on the Ethernet ring 110 and the binding. The forwarding information may indicate which ring port that is used on the network device 101 to forward MAC frames to a destination corresponding to the MAC address MAC2. The MAC frames may then be forwarded by the processor 201 based on the updated forwarding information.

In an exemplary embodiment of the invention, the Ethernet ring 110 may utilize a VLAN frame format such as an IEEE 802.1 Q VLAN tagging frame format, and each of the MAC frames 300 from the MAC address MAC2 may comprise a first VLAN tag 304. In this regard, the processor 201 may be operable to utilize a newly added second VLAN tag 303 in each of the MAC frames 300, where the second VLAN tag 303 may identify the peer device 102. The binding between the MAC address MAC2 and the peer device 102 may then be determined by the processor 201 based on the second VLAN tag 303.

In an exemplary embodiment of the invention, the Ethernet ring 110 may utilize a Q-in-Q frame format such as an IEEE 802.1ad double tagging frame format. Each of the MAC frames 310 from the MAC address MAC2 may comprise a first VLAN tag 315 and a second VLAN tag 314, and the first VLAN tag 315 may comprise a customer tag (C-Tag) and the second VLAN tag 314 may comprise a service tag (S-Tag). In this regard, the processor 201 may be operable to utilize a newly added third VLAN tag 313 in each of the MAC frames 310, where the third VLAN tag 313 may identify the peer device 102. The binding between the MAC address MAC2 and the peer device 102 may then be determined by the processor 201 based on the third VLAN tag 313.

In an exemplary embodiment of the invention, the Ethernet ring 110 may utilize a MAC-in-MAC frame format such as an IEEE 802.1ah-2008 PBB frame format. In the MAC-in-MAC frame format, each of the MAC frames 320 from the MAC address MAC2 may comprise a source MAC address 302, which represents the MAC address MAC2, and a backbone source MAC address 322. The backbone source MAC address (B-SA) 322 may identify the peer device 102. In this regard, the processor 201 may be operable to determine the binding between the MAC address MAC2 and the peer device 102 based on the backbone source MAC address (B-SA) 322.

In an exemplary embodiment of the invention, the forwarding information may comprise a MAC table 202*a* with a destination MAC address field 401, a ring port field 402 and a ring node field 403. In this regard, the processor 201 may be operable to enter an entry in the ring node field 403 corresponding to the MAC address MAC2 with an identifier of the peer device 102 (ring node 4) based on the binding. An entry in the ring port field 402 corresponding to the MAC address MAC2 may be updated with a ring port for forwarding the MAC frames by the processor 201 based on the ring topology 100, the failure position 130 and the peer device 102 (ring node 4) entry in the ring node field 403.

In another exemplary embodiment of the invention, the forwarding information may comprise a MAC table 202*a* and a protection table 202*b*. The MAC table 202*a* may comprise a MAC address field 401 and a ring node field 403, and the protection table 202*b* may comprise a ring node field 404 and a ring port field 405. In this regard, the processor 201 may be operable to enter an entry in the ring node field 403 of the MAC table 202*a* corresponding to the MAC address MAC2 with an identifier of the peer device 102 (ring node 4) based on the binding. An entry in the ring port field 405 of the protection table 202*b* corresponding to the peer device 102 (ring node 4) in the ring node field 405 of the protection table 202*b* may be updated with a ring port for forwarding the MAC frames by the processor 201, based on the ring topology 100 and the failure position 130. The processor 201 may then be operable to forward the MAC frames based on the updated protection table 202*b*.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for Ethernet ring protection without MAC table flushing.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   transmitting, using a network device in an Ethernet ring, a frame to a peer device in the Ethernet ring using a first port in the Ethernet ring, wherein the first port in the Ethernet ring is determined using a medium access control (MAC) table and a protection table for the MAC table, wherein the MAC table comprises data indicating a first association between a MAC address and the peer device, and wherein the protection table comprises data indicating a second association between the peer device and the first port in the Ethernet ring;
   obtaining, using the network device, a message indicating that a link failure has occurred on the Ethernet ring;
   responsive to the message, updating, using the network device, the protection table to comprise data indicating a third association between the peer device and a second port in the Ethernet ring while maintaining the data in the MAC table;
   receiving, using the network device, a plurality of messages from a plurality of other peer devices, the plurality of messages indicating that the link failure has occurred;
   determining, using the network device, a location of the link failure using the plurality of messages; and
   receiving, using the network device, a frame corresponding to data transmitted from the MAC address, the frame corresponding to the data transmitted from the MAC address comprising a virtual local area network (VLAN) tag,
   wherein the second port is based on the location of the link failure.

2. The method of claim 1, comprising:
   identifying, using the network device, the location of the link failure using the message; and
   determining, using the network device, the second port in the Ethernet ring using the location.

3. The method of claim 1, comprising:
   identifying, using the network device, a topology for the Ethernet ring; and
   determining, using the network device, the second port in the Ethernet ring using the topology.

4. The method of claim 1, wherein the Ethernet ring utilizes a Q-in-Q frame format.

5. The method of claim 1, wherein the Ethernet ring utilizes a MAC-in-MAC frame format.

6. A method, comprising:
   storing, using a network device in an Ethernet ring, a device identifier in association with a medium access control (MAC) address to indicate that the MAC address is accessible through a peer device that is represented by the device identifier, wherein the device identifier is stored in a MAC table;

storing, using the network device, a first port identifier in association with the peer device to indicate that the peer device is accessible using a first port in the Ethernet ring that is represented by the first port identifier, wherein the first port identifier is stored in a protection table;

detecting, using the network device, a link failure on the Ethernet ring;

responsive to the link failure being detected, storing, using the network device, a second port identifier in association with the peer device to indicate that the peer device is accessible using a second port in the Ethernet ring that is represented by the second port identifier;

receiving, using the network device, a plurality of messages from a plurality of other peer devices, the plurality of messages indicating that the link failure has occurred;

determining, using the network device, a location of the link failure using the plurality of messages; and receiving, using the network device, a frame corresponding to data transmitted from the MAC address, the frame comprising a virtual local area network (VLAN) tag, wherein the second port identifier is based on the location of the link failure.

7. The method of claim 6, comprising:
identifying, using the network device, a binding between the peer device and the MAC address using the VLAN tag.

8. The method of claim 7, wherein the Ethernet ring utilizes a Q-in-Q frame format.

9. The method of claim 6, comprising:
receiving, using the network device, the frame corresponding to the data transmitted from the MAC address, the frame comprising a backbone source MAC address; and
identifying, using the network device, a binding between the peer device and the MAC address using the backbone source MAC address.

10. The method of claim 6, wherein:
the MAC table comprises a MAC address field and a ring node field;
data representing the MAC address is in the MAC address field; and
the device identifier is in the ring node field.

11. The method of claim 6, wherein the second port identifier is stored in the protection table.

12. A system, comprising:
a network device configured to operate in an Ethernet ring, the network device comprising circuitry configured to:
store, in a memory, a device identifier in association with a medium access control (MAC) address to indicate that the MAC address is accessible through a peer device that is represented by the device identifier;
store, in the memory, a first port identifier in association with the peer device to indicate that the peer device is accessible using a first port in the Ethernet ring that is represented by the first port identifier;

responsive to a link failure detected on the Ethernet ring, store, in the memory, a second port identifier in association with the peer device to indicate that the peer device is accessible using a second port in the Ethernet ring that is represented by the second port identifier;

receive a plurality of messages from a plurality of other peer devices, the plurality of messages indicating that the link failure has occurred;

determine a location of the link failure using the plurality of messages; and receive a frame corresponding to data transmitted from the MAC address, the frame comprising a virtual local area network (VLAN) tag, wherein the second port identifier is based on the location of the link failure.

13. The system of claim 12, wherein the Ethernet ring utilizes a virtual local area network (VLAN) frame format.

14. The system of claim 12, wherein the Ethernet ring utilizes a Q-in-Q frame format.

15. The system of claim 12, wherein the Ethernet ring utilizes a MAC-in-MAC frame format.

16. The system of claim 12, wherein the circuitry is configured to:
determine binding data between the MAC address and the peer device using the VLAN tag.

17. The system of claim 12, wherein the circuitry is configured to:
receive the frame corresponding to the data transmitted from the MAC address, the frame comprising a backbone source MAC address; and
determine binding data between the MAC address and the peer device using the backbone source MAC address.

18. The system of claim 12, wherein the circuitry is configured to:
associate data representing the MAC address with a MAC address field in a MAC table; and
associate the device identifier with a ring node field in the MAC table.

19. The system of claim 12, wherein the circuitry is configured to:
associate data representing the MAC address with a MAC address field in a MAC table;
associate the device identifier with a first ring node field in the MAC table;
associate the device identifier with a second ring node field in a protection table; and
associate the first port identifier with a ring port field in the protection table.

* * * * *